United States Patent [19]
Stein et al.

[11] Patent Number: 5,307,299
[45] Date of Patent: Apr. 26, 1994

[54] CIRCUIT ARRANGEMENT FOR THE DIGITAL PROCESSING OF SEMICONDUCTOR DETECTOR SIGNALS

[75] Inventors: Jürgen Stein, Wuppertal, Fed. Rep. of Germany; Andrey Georgiev, Sofia, Bulgaria; Andree Büchner, Dresden; Werner Gast, Cologne, both of Fed. Rep. of Germany

[73] Assignees: Forschungszentrum Julich GmbH, Julich; Forschungszentrum Rossendorf E.V., Dresden, both of Fed. Rep. of Germany; a part interest

[21] Appl. No.: 988,095

[22] Filed: Dec. 9, 1992

[30] Foreign Application Priority Data

Dec. 9, 1991 [DE] Fed. Rep. of Germany ....... 4140496
Aug. 7, 1992 [DE] Fed. Rep. of Germany ....... 4226175

[51] Int. Cl.$^5$ .......................................... G06F 15/336
[52] U.S. Cl. ................................................ 364/728.01
[58] Field of Search ...................... 364/728.01, 551.01, 364/553, 556, 524

[56] References Cited

U.S. PATENT DOCUMENTS

5,072,415 12/1991 Cannelli et al. ..................... 364/556

OTHER PUBLICATIONS

P. Casoli, "Improved Pulse-Height Store for A/D conversion", North Holland Publishing Co., Clear Instruments & Methods 166, pp. 299–304 (1979).

C. Cottini et al., "A New Method for Analog to Digital Conversion**", Nuclear Instruments and Methods 24 (1963) pp. 241–242.

F. S. Goulding, "Signal Processing for Semiconductor Detectors", IEEE Transaction on Nuclear Science, vol. NS-29, No. 3, Jun. 1982, p. 1125.

M. L. Simpson, "Charge Trapping Correction in GE Spectrometers", IEEE Transactions on Nuclear Science, vol. 36, No. 1, Feb. 1989, pp. 260–266.

E. Fairstein, "Linear Unipolar Pulse-Shaping Newtworks; Current Technology", IEEE Transactions on Nuclear Science, pp. 382–397 Apr. 1990.

F. S. Goulding, "Pulse-Shaping in Low-Noise Nuclear Amplifiers; A Physic Approach to Noise Analysis", Nuclear Instruments . . . , pp. 493–504 (1972).

B. W. Loo et al.; "Ballistic Deficits in Pulse Shaping Amplifiers," IEEE Transactions on Nuclear Science, vol. 35, No. 1, Feb. 1990, pp. 114–124.

S. M. Hinshaw, "A Practical Approach to Ballistic Deficit Correction", IEEE Transactions on Nuclear Science, vol. 37, No. 2, Apr. 1990, pp. 374–377.

Primary Examiner—Tan V. Mai
Attorney, Agent, or Firm—Herbert Dubno

[57] ABSTRACT

A system for processing the signals from a gamma or other radiation detector through a charge-sensitive preamplifier, makes use of a fast analog to digital converter at the input, preferably downstream of an anti-aliasing filter, and circuitry for the deconvolution of the signal in which the preamplifier transfer function is convoluted with the charge distribution function The deconvolution results which are free from any charge related to any radiation event are averaged and subtracted from the averaged value of the deconvolution results, which results contain completely the charge of the event under processing, and the subtracted signal through a register provides the output. The system represents a significant improvement with respect to the ballistic deficit suppression and with respect to the noise index-counting rate factor allowing a significant improvement in the counting rate for a given noise level or a higher resolution for a given counting rate.

12 Claims, 4 Drawing Sheets

CIRCUIT ARRANGEMENT FOR THE DIGITAL PROCESSING OF SEMICONDUCTOR DETECTOR SIGNALS

FIELD OF THE INVENTION

The invention relates to a circuit arrangement intended for determining the total charge generated in a semiconductor radiation detector by a single radiation event by means of digital processing of the signals from the charge-sensitive preamplifier following the detector.

BACKGROUND OF THE INVENTION

The processing of signals from semiconductor detectors can be effected in high-resolution spectroscopic analysis systems as an optimization compromise to determine with the greatest possible precision, the energy of the radiation quanta (X-ray radiation, gamma radiation, charged-particle radiation) at the greatest possible throughput In gamma-ray spectroscopy, for example, because of the high intrinsic resolution (about 0.1%) of the germanium detector the analog detector signals have to be analyzed with an integral non-linearity of better than 0.02% and a differential nonlinearity of better than 0.3% over a dynamic range of about 70 dB. The targeted throughput or rate is $10^4$–$10^5$ events per second.

The range of applications of semiconductor spectroscopy systems is very wide and ranges from measuring systems for environmental protection, medicine and materials research to large scale experimental projects in nuclear physics and cosmology basic research In conventional techniques for the processing of semiconductor signals, it has been common heretofore to make use of analog pulse amplifiers (spectroscopy amplifiers SA) in combination with high-resolution analog-to-digital converters (ADC). Within the spectroscopy amplifier a pulse shaping of the preamplifier signal is performed with the goal of optimizing the throughput and the signal/noise ratio to yield an output signal whose amplitude corresponded with the greatest possible precision to the charge generated in the semiconductor detector Additionally, the spectroscopy amplifier usually contains circuitry for zero-line stabilization (baseline restoration) and for elimination of pulse pile-ups (pile-up rejection). The output signal of the spectroscopy amplifier is digitalized by the ADC. The ADC contains, in addition to the peak detector/-stretcher and a linear gate, to fix the signal amplitude during the conversion interval, an amplitude-to-time converter and, finally, a time-to-digital converter (Wilkinson ADC).

This conventional type of signal processing has a number of drawbacks The effective resolution of the semiconductor spectrometer is limited by the "ballistic deficit" and the "charge trapping" effects. The maximum throughput is limited by the pulse pile-up and the long conversion time of the ADC's. Finally the system has a high degree of sensitivity to temperature fluctuations and poor long-term stability because of the large number of analog components used in each signal channel.

The "ballistic deficit" effect is caused by differences in the charge distribution of the detector signal in the charge-collection interval and manifests itself in different shapes and rise times of the leading edge of the preamplifier output signal. The fixed transfer function of the preadjusted pulse-shaping network, in the spectroscopy amplifier SA compensates only partly these differences and transforms them into fluctuations of the pulse amplitude in the direction of decreasing values. It is this reduction in the pulse amplitude which is referred to as the "ballistic deficit." Recently various methods based upon analog circuitry has been developed to correct for these deficits in the pulse amplitude, as well as for the deficits caused by "charge carrier trapping" effects, (F. S. Goulding and D. A. Landis, IEEE 35 (1988) p. 119; M. L. Simpson et al, IEEE 36 (1989) p. 260; S. M. Hinshaw and D. A. Landis, IEEE 37 (1990) P. 374). The most common correction technique was the Goulding-Landis method.

The latter determines the correction factor based upon different time shifts of the pulse maxima after pulse shaping. It yields some improvement in the energy resolution, but nevertheless a significant energy dependency of the result remains and it is not able to account for minority charge carrier trapping effects.

In order to optimize the throughput of spectroscopy analyzer system, attempts have been made in both directions, namely on the one hand, to minimize the dead time of the analog spectroscopy amplifier, and, on the other hand, to minimize the conversion time of the analog-to-digital converter.

To reduce the dead time of the analog signal processing, a gated integrator (GI) has been introduced. In the gated integrator system, a pulse-shaping network with a comparatively small time constant is followed by the gated integrator. With this system, it is possible to obtain an improved behavior of the spectroscopy amplifier at high counting rates, but at the expense of a overall poorer energy resolution.

A reduction in the conversion time of the analog-to-digital converters (ADCs) can be achieved by replacing the Wilkinson method by a binary weighting (successive approximation) method (P. Casoli and P. Maranosi, Nucl. Instr. Meth. 166 (1979) p. 299). Since the last method has a significant inherent differential nonlinearity it must be combined with a sliding scale method (E. Gatti, Nucl. Instr. Meth. 24 (1963) p. 241). The combined method yields a significant reduction in the conversion time, but nevertheless has several drawbacks. One is, like with the Wilkinson method, the need of analog circuitry like peak-detector/stretcher and linear gate in order to fix the pulse amplitude for the conversion interval. This again gives rise to various drawbacks sensitivity with respect to count rate and temperature fluctuations. A second is that the advantage of the sliding scale method, which in principle is an averaging method requiring a statistical significant number of measured values is lost because in the case of low statistic or individual measurements due to the bad channel profile.

In general, practically all currently used methods for processing semiconductor detector signals have temperature and long-term instabilities which can have a significant effect upon the main system parameters like resolution and integral linearity. This can be mainly attributed to the large number of analog electronic components which one finds in conventional spectroscopic analyzer systems and to their sensitivity to external influences.

Recently efforts have been made to overcome the problem of the stability of spectrometer systems by replacing the gated integrator and the analog-to-digital converter (ADC) with a fast digitalizer (flash ADC). In this method, the signal shape is digitalized after the analog pulse shaping. This technique also results in incomplete handling of the problems of "ballistic and charge carrier trapping" deficits, since these problems have their origin in the analog pulse shaping. In addition the method introduces a new, special "ballistic deficit" problem, whose origin is to be found in the uncorrelated time position of pulse maxima relative to the sampling raster. As a consequence, this method has to date found application only in cases in which a high energy resolution is not required.

OBJECTS OF THE INVENTION

It is the principal object of our present invention to provide an improved circuit arrangement for a digital processing of signals from semiconductor detectors with charge-sensitive preamplifiers whereby the drawbacks of earlier systems, as described, can be avoided.

Another object of the invention is to provide improved circuitry for such systems as will more fully suppress the "ballistic deficit" and "charge carrier trapping" effects, which will allow for high count rates with maximum energy resolution, and which will afford optimal temperature and long-term stability.

SUMMARY OF THE INVENTION

These objects, and others that will become apparent hereinafter are attained, in accordance with the present invention in a circuit arrangement for digitally processing semiconductor detector signals representing a total charge generated in a semiconductor radiation detector by a radiation event and wherein a charge-sensitive preamplifier is connected to the semiconductor radiation detector. The circuit arrangement comprises:

an input connected to the charge-sensitive preamplifier and receiving a preamplified signal therefrom;

a fast analog-to-digital converter operatively connected to the input for sampling and digitalizing the preamplified signal from the charge-sensitive preamplifier;

a time-detector and control unit connected to the input for detecting the beginning of the signal to be processed and for enabling, emitting, outputting or producing all control signals required by the arrangement;

means for calculating as an end result a total charge generated in the semiconductor detector by a single radiation event by forming a difference between a value related to the total charge generated in the semiconductor detector by a single radiation event is obtained over L results of a numerical deconvolution of the input signal by the practically well-defined preamplifier transfer function, in a number L of such time windows which cover completely the charge distribution of the radiation event, and a value representing the temporary charge contribution of the step noise to the measured charge is obtained from N results of a deconvolution of the input signal by the practically well-defined preamplifier transfer function in a number N of such time windows which do not contain charge related to any other radiation event, whereby:

a) for the numerical deconvolution of the digitalized input signal by the practically well defined transfer function of the preamplifier over a time window of a width of M sampling intervals, and for generating a continuous series of results of the deconvolution spaced apart by one sampling interval, where the time window slides over the sampled values so that each new result is derived from a window shifted by one sampling interval relative to the previous window position with a module which is defined as the module for sliding deconvolution and whose input is connected with the output of the ADC;

(b) to determine the total charge related to the radiation event using L results from the series of deconvolution results produced by the sliding deconvolution module and which L results contain completely the total charge of the same event, a further module has its input connected to the output of the sliding deconvolution module;

(c) to determine the contribution of the temporary step noise using N results from the series of deconvolution results produced by the moving window deconvolution module and which N results do not contain any charge related to any radiation event, another module is provided whose input is connected to the output of the moving window deconvolution module;

(d) for calculating the end result by subtraction of the temporary contribution of the step noise from the value related to the total charge, yet a fourth module is provided which is connected to the further module for storage of the final result; where the number M, i.e. the width of the window in units of the sampling interval, over which the deconvolution of the input signal by the practically well-defined preamplifier transfer function is effected, is greater by L sampling intervals than a maximum tie interval in which the generation of charge related to the radation event can occur and thus by L sampling intervals greater than the maximum charge collection time, and the count N is equal or greater than L.

The circuit of the invention is characterized by an outstanding suppression of the "ballistic deficit" and "charge carrier trapping" effects and also by a high resolution/dead time ratio and a good temperature and long-term stability. With this circuit arrangement, the original undistorted charge distribution of the detector signal is reconstructed to enable an ideal ballistic measurement whose result is independent from the respective actual shape or characteristic of the charge distribution.

In a semiconductor detector each radiation event (impact, collision or incident) generates a quantity of charge which corresponds to the absorbed energy. This charge is collected by a charge-sensitive preamplifier connected to the detector and which generates a step-like rise at its output. In the systems for which the invention is concerned, i.e. for high counting rate and with simultaneously good energy resolution systems, the resistor discharged preamplifiers are mainly used so that the step-like rise of the signal is followed by an exponential tail (decay) whose time constant, compared with the rise time is very long. Mathematically, the preamplifier output signal $V_p(t)$ can be described as a convolution between the charge distribution function g(t) and the preamplifier transfer function f(t) in accordance with the convolution integral:

$$U_p(t) = \int_{-\infty}^{+\infty} g(t)f(t-\tau)d\tau \qquad (1)$$

For the case in which the charge collection is assumed to be instantaneous g(t) can be replaced by a δ-function and equation (1) becomes $$U_p(t) = G f(t) \qquad (2)$$

whereby G is the total charge proportional to the absorbed energy.

In conventional, analog pulse shaping, these conditions are met only if the charge collection time is very short in comparison to the time constant of the pulse shaping. For large volume coaxial germanium detectors which are operating at high counting rates, i.e. at relatively short time constants of pulse shaping, this is not the case however. The inadequate pulse shaping results in a reduction of the pulse amplitude which, as previously explained, is the "ballistic deficit" effect.

The circuit arrangement of the invention avoids this problem by using, as a first step in the signal processing, the reconstruction of the original charge distribution of the detector signal by means of deconvolution of the preamplifier output signal by the preamplifier transfer function so that an ideal ballistic measurement of the total charge of the radiation event is performed.

Such a deconvolution is practically impossible by means of analog signal processing. Therefore, the semi-conductor detector signal directly after the charge sensitive preamplifier is sampled by a fast ADC and digitalized. All further processing is then performed in a digital environment. For the discrete values of the digitalized preamplifier output signal, the convolution integral of equation (1) becomes a sum:

$$U_p(i\ t_s) = \sum_{j=0}^{\infty} g(j\ t_s) f(i\ t_s - j\ t_s) \qquad (3)$$

in which $t_s$ represents a sampling interval, i.e. the time interval between two successive sampling points of the signals $U_p(t)$. For a time axis normalized to $t_s$, equation (3) gives:

$$U_p(i) \bigg|_{i=0}^{\infty} = \sum_{i=0}^{\infty} g(j) f(i - j) \qquad (4)$$

The deconvolution of the discrete charge distribution function g(j), i.e. the solution of this system of equations in its general form with respect to g(i), cannot be carried out at reasonable computing costs. Several simplifications of the calculation process can be carried out so that the processing can be performed in real time. Firstly, the deconvolution procedure can be limited to a window of the width M, i.e. of M successive values spaced by $t_s$ of one sampling interval so that the number of equations in equality (4) is reduced to M. This does not affect the result for the total charge to be calculated as long as the time interval $Mt_s$ is greater than the maximum expected charge collection time. Secondly, for determining the energy of the radiation event, the determination of the total charge is sufficient as far as a detailed determination of the actual time-dependent characteristic of the charge collection, i.e. the shape of the charge distribution function g(j), is not required. Thirdly, the preamplifier transfer function f(i) usually, is very well known and easy to describe mathematically. In the case of preamplifiers in which the discharge is effected via a resistor, it is a simple exponential function.

These three conditions allow a solution of the equation system (4) by means of a simple recursion formula:

$$G_i = g(i) \bigg|_{i=0}^{i} = U(i) + (i-k) \sum_{j=0}^{i-1} U(j) \qquad (5)$$

where $k = \exp-(t_s/t_{RC}) = e^{-(t_s/tRC)}$, the decay constant of the preamplifier transfer function for one sampling interval. At the instant i=M, the collected charge G becomes equal to $G_M$ and thus equal to the accumulated total charge in the time interval O to $Mt_s$. The recursion formula (5) has two important characteristics:
(i) The final result $G_M$ is obtained after M successive steps, whereby for each step only one multiplication - accummulation and one summation need be carried out. Each step corresponds to a new sampled value from the input digitalizer, i.e. the recursion can be effected in real time. (ii) The recursion can be easily expanded beyond the region predetermined by the volume M:

$$G_{L+M} = G(i) \bigg|_{i=L}^{L+M} = U(i) - U(i-M) + (I-k) \sum_{j=i-M}^{i-1} U(j) \qquad (6)$$

i.e. by introducing only one more operation (subtraction) per step the convolution can be effected in a new window.

From the fact that the parameter L in equation (6) can be any optional number, the deconvolution process can be continuous or stated otherwise, the deconvolution can "slide". This process is referred to as sliding deconvolution or moving window deconvolution. In the circuit arrangement according to the invention, the process is used for all sampled values of the input digitalizer, i.e. with each new sampled value, a new measurement is made of the actual amount of charge found in the deconvolution window. The final result, namely the total amount of the charge generated in the semiconductor detector by a single radiation quantum, is obtained by forming the difference between the measured value from the measurements attributed to the radiation event and the measured value for he temporary contribution of the step noise. The measured value for the total charge is determined from the L results of the deconvolution in L successive time windows which respectively fully cover the time distribution of the total charge ascribed to the radiation event. The contribution of the step noise is given by the N results of the deconvolution in the N actual time windows in which there is no contribution of any radiation quanta.

To perform the moving deconvolution in consecutive time windows of widths of M sampling intervals shifted with respect to each other by one sampling interval, thereby generating a series of deconvolution results succeeding one another in a time-distance corresponding to one sampling interval, a moving window deconvolver or deconvoluter MWD is used which is connected with the output of the ADC. This module is a direct realization of the above-described process.

To determine a value representative of the total charge of the radiation event, we provide a module downstream of the MWD module. This module processes a series of consecutive L values of which each individual value completely represents the total charge generated by radiation quanta. The corresponding values are extracted from the data stream of results of moving window deconvolutions generated by the MWD module.

The temporary contribution of the step noise is supplied by a module or circuit unit which is also connected downstream of the MWD module. This module processes the N results of moving window deconvolutions which contain no contribution from any radiation quanta and which are outputted by the MWD module before and after each radiation event.

The final result which represents the total charge produced by a single event is obtained with a module or circuit unit connected to the previously described modules and which subtracts the temporary contribution of the step noise from the measured value representing the total charge of each radiation quantum.

In the foregoing, M represents the width of the time window in units of sampling intervals in which the deconvolution is effected. It is greater by L sampling intervals than the maximum time period in which a deposition of charge ascribed to individual radiation quanta are to be found. The number N is equal to or greater than L.

According to a feature of the invention a digital signal processor (DSP) or known circuit elements are provided which include an M-stage digital delay unit, a subtractor, a single stage delay unit, an adder and a multiplier with a constant multiplication factor K. The delay M defines the width of the window in which the deconvolution is effected. It must be greater than the maximum charge collection time of the semiconductor detector connected to the circuit. The constant K is chosen in accordance with the decay constant of the preamplifier and the duration of the sampling interval.

The input of the MWD module is connected directly with positive input of the subtractor and indirectly via the M-stage delay with the negative input of the subtractor. The output of the subtractor is connected via the single-stage delay unit with the first input of the adder. The output of the adder is connected via a further single-stage delay to a second input of the adder in a feedback loop and via the multiplier with the first input of an output summer or adder. The second input of the latter is connected to the output of the subtractor.

The module of the circuit arrangement of the invention for determining the value representing the total charge of the radiation quantum is a module or unit for coverage or mean value formation AU or averager. This module can include an accumulator, a register and a multiplier for multiplication with a factor 1/L. The constant L corresponds to the number of values over which averaging is effected.

The input of the averager AU is the input to the accumulator. The output of the accumulator is connected via the multiplier with the input to the output register. The clock input of the accumulator is simultaneously the clock input of the averaging module AU. The reset input of accumulator and the clock of the output register are connected with the timing control input of the AU module.

The circuit for determining the contribution of the temporary step noise uses a sliding or moving average unit MAU. The latter realized in digital circuit elements can include an accumulator an N stage FiFo (first in first out) storage or memory, a subtractor and a multiplier with the constant multiplication factor 1/N. The constant N corresponds to the number of values over which the mean value is calculated.

The input of the MAU module is connected directly with the positive input of the subtractor and indirectly via the FiFo memory with the negative input of the subtractor. The output of the subtractor is fed via the multiplier to the input of the accumulator. The clock input of the accumulator and the clock of the FiFo are connected with the clock input of the MAU module.

As a circuit element for calculating the final result a subtractor is used. The inputs of the subtractor are connected with the outputs of the modules AU or MAU. It subtracts the temporary average contribution of the step noise calculated by the MAU module from the mean value of the total charge of the actual processed radiation quantum. A register is connected downstream of the subtractor which stores the results for further data acquisition.

It has been found to be advantageous, moreover, to provide a low-pass filter between the charge-sensitive preamplifier and the fast analog-to-digital converter to avoid the aliasing effect resulting from the high frequency component 8 of the delta noise.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
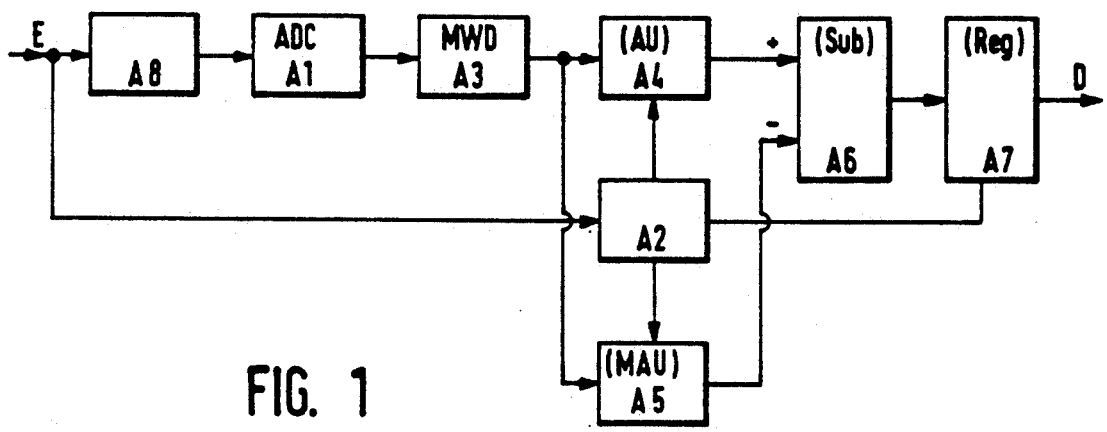
FIG. 1 is a block diagram of the overall signal processing circuit.

As can be seen from FIG. 1, a detector signal E, derived from a gamma detector G and a preamplifier SV is sampled by a fast analog to digital converter A1 and is digitalized.

The resulting data stream, in the form of sampled values following in a sequence with a distance of one sampling interval, is fed to a module for moving deconvolution as represented at A3.

This module, referred to as a moving window deconvolutor, carries out a continuous deconvolution of the data stream in which the preamplifier transfer function and the charge distribution of the detector signal E are convoluted. The moving window deconvoluter covers M the most recent input values generating, for each new input value a new result. That means that the input data stream is transformed into a new data stream of consecutive deconvolution results separated by one sampling interval. As soon as the window in which the moving window deconvolution of the input signal is effected covers the charge distribution from a single radiation quanta, the result of the deconvolution immediately yields the total charge ascribed to the radiation event. Since the deconvolution is effected each time over the total range of the window, the result is independent of the actual charge distribution within the window and an ideal ballistic measurement is carried out.

The width M of the window is chosen to be L sampling intervals greater in length than the maximum distribution in time of the total charge of the event, i.e.

L results of the deconvolution represents the total charge. They are therefore closely correlated with the charge of the event but largely uncorrelated with respect to the statistical noise, i.e. the serial or delta noise. The averaging over these L consecutive results yields a value for the total charge whose signal/noise ratio increases with the number L. It is the purpose of the module to average over this L deconvolution results and to supply a value which represents the total charge of the radiation quantum. For this purpose as can be seen from FIG. 1, the averaging module A4 has its input connected to the moving window deconvoluter A3.

When the window covers a time range which does not contain any charge resulting from any radiation event, the deconvolution result in the time window contains noise. This noise is due to the preamplifier input current, detector reverse current, etc. and can be referred to as parallel or step noise. All deconvolution results over a range which does not contain charge from any radiation event, therefore, represent the contribution of this noise. By averaging over N such results it is possible to reduce statistical fluctuations in the contribution of the step noise by a factor of $\sqrt{N}$. The N deconvolution results need not be drawn from consecutive measurements.

So that the relatively slow changes or fluctuations in the contribution of the step noise, for example, due to changes in the detector temperature, can be evaluated, the process for processing the step noise utilizes a moving average value former or moving averager A5. This means that only the N most recent results of deconvolution are used to evaluate each mean value and each new data entry results in a new updated value for the contribution of the step noise The moving averager A5, therefore, receives all of the deconvolution results which do not contain charge from a radiation event and with each new result, produces a new mean value over the N most recent values.

Referring again to FIG. 1, it can be seen that a subtractor A6 evaluates the difference described previously. It receives at its negative input, through the moving averager A5, the temporary mean contribution of the step noise and subtracts it from a mean value supplied by the average A4 to the positive input of the subtractor.

In the register A7, the results are subjected to intermediate storage prior to further processing, display or storage.

If necessary, between the preamplifier and the fast analog to digital converter A1, a low pass filter A8 is provided as an anti-aliasing filter against high frequency components of the delta noise. This can insure satisfaction of the sampling theorem and the discontinuities ascribable to discrete sampling in the residuum functions of the delta and step noise can be avoided.

A control unit A2, in the form of a time discriminator circuit, detects the arrival of a new radiation event and generates all of the necessary control and timing signals for the moving average module A5 and the averaging module A4 and, of course, for the output register A7.

As soon as the control unit detects the beginning of a new event, it cuts off the moving average module. After a fixed time interval, which is longer than the maximum charge accumulation time the averaging module A4 opens for a time period of L scanning intervals.

Directly after these L intervals, the subtraction is carried out and the end result is determined.

The control unit stores this in the output register A7 and opens the moving averager module A5 to allow the process to continue. If, in the meantime, a further event is registered, the control unit will block the averaging module A4, reset it and increase the duration of closure of the module A5 by further M sampling interval. The minimum distance between two events which are to be correctly processed is M scanning intervals. If the distance is shorter, the first event is canceled and the second is blocked, i.e. neither would give rise to a final result. In all cases the control unit supplies the required control signals.

The circuit arrangement in FIG. 1 has a superior surpression of the "ballistic deficit" and the "charge carrier trapping" effects. This can be seen by a comparison of this circuit with a spectroscopic amplifier SA with quasi Gaussian pulse shaping as is typically used in modern semiconductor spectrometer systems.

This comparison was chosen because the quasi Gaussian pulse shaper shows somewhat better "ballistic deficit" characteristics than most other pulse shaping networks which are currently employed, like, for example, the quasi triangular or sine-N pulse shaper. A simple method of calculating the reduction in resolution resulting from the ballistic deficit effect (B. Loo, F. Goulding, IEEE Trans. Nuc. Sci. 35 (1988)) is the following:

$$FWRM_{BD} = \frac{n \cdot E_o}{24} \left( \frac{T_{min}}{t_o} \right)^2 = \frac{n \cdot E_o}{4 \cdot 24} \left( \frac{T_{max}^2}{t_o} \right) \quad (7)$$

In this evaluation, $E_o$ represents the energy of the radiation quantum, n the order of the quasi Gaussian pulse former, $T_{min}$ and $T_{max}$ represent the min and max charge collection time and $t_o$ the peaking time of the step response of the pulse shaper.

If one inserts into equation 7 a value $E_o = 1.33$ MeV (characteristic line of $^{60}$Co), $T_{max} = 800$ ns (typical value for large volume coaxial Ge detectors), n=2.83 (an optimum parameter set for a good ballistic deficit performance of the exactive pulse shaping network in the ORTEC 472 spectroscopy amplifier) and to=4.45 μs (corresponding to a pulse shaping time constant of $\tau_s = 4.45/2.225 = 2$ μs) and a total pulse processing time, i.e. deadtime of $t_d = (2.225 + 7)*2$ μs = 18.45 μs) then the broadening of the $^{60}$Co line as a result of the ballistic deficit effect is about 1.27 KeV. It should be noted that the resolution degradation associated with the ballistic deficit effect linearly increases with the energy of the radiation quantum and quadratically with the charge collection time.

For the circuit of FIG. 1, by contrast, the ballistic deficit effect disappear completely since the deconvolution process insures that the total charge of the radiation quantum always is evaluated without any losses. Moreover, the process is independent of the energy quantum and the charge collection time as long as it can be insured that the width of the window, in which the moving window deconvolution is carried out, is always greater than the maximum charge collection time. There is, however, some new kind of ballistic deficit effect because of the finite sampling frequency or the finite length of the sampling interval, within which asymmetry in the charge distribution can occur. The equation which describes this effect can be determined by analogy to the quasi Gaussian case and is substantially as follows:

$$FWHM_{BD} = \frac{T_S}{12 \cdot t_{RC}} \cdot \frac{E_o}{(T_{max}/T_S) + 1} \qquad (8)$$

Figure 5:
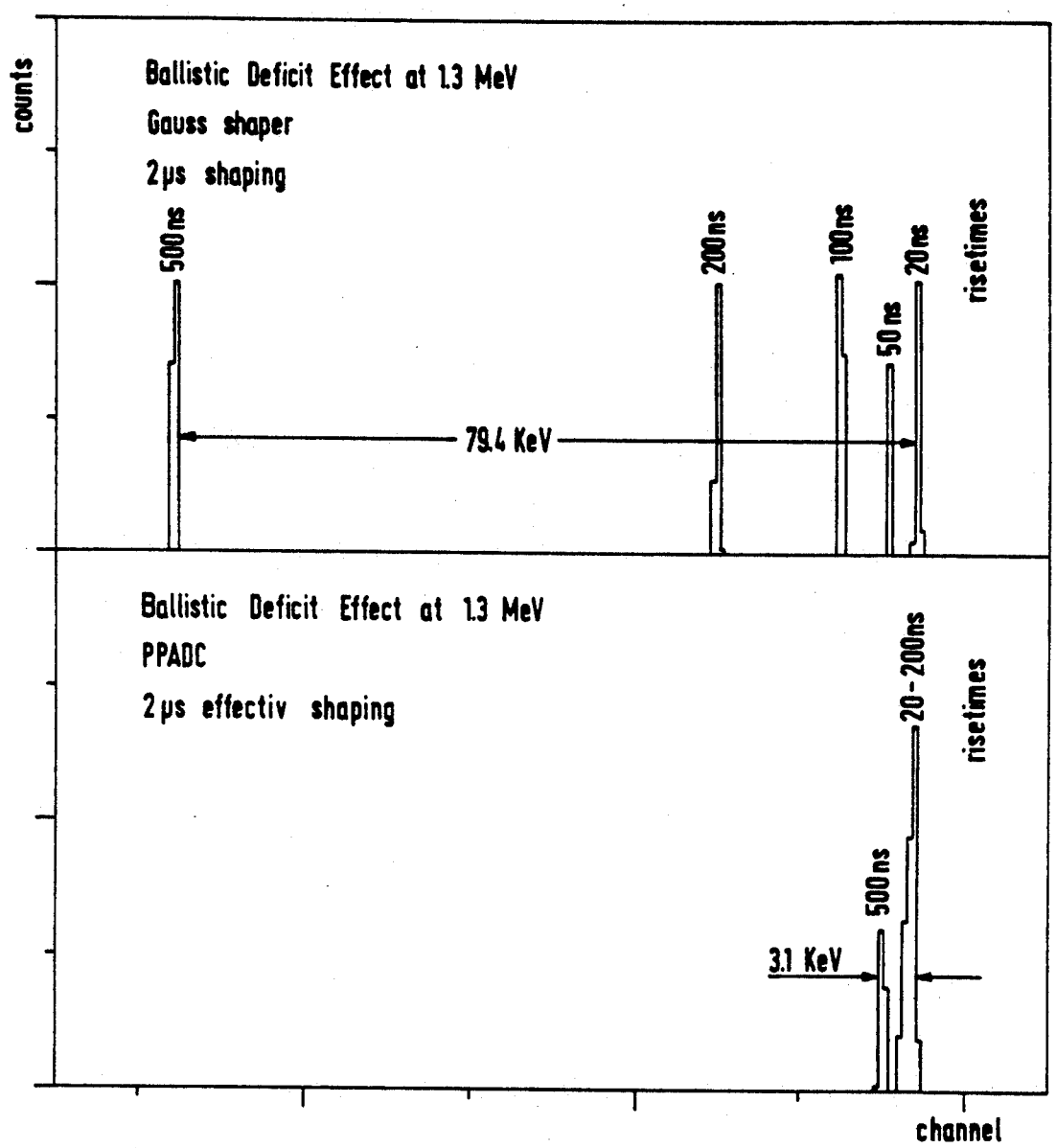
FIGS. 5 and 6 are graphs illustrating the invention.

In this relationship, $T_S$ represents the duration of the sampling interval and $T_{RC}$ represents the decay constant of the preamplifier, while $E_o$ and $T_{max}$ have the same meaning as was given above. If one inserts into equation (8) the aforementioned values $E_o = 1.33$ MeV, $T_{max}$ equals 800 ns and one sets $T_S = 40$ ns (i.e. 25 MSPS sampling rate), $t_{RC} = 50$ μs and a window width of 100 sampling intervals corresponding to a time window of 4 μs and thus comparable to $t_o = 4.45$ μs of the quasi Gaussian pulse shaper there is a degradation of the resolution for the $^{60}$Co characteristic line of only 0.08 KeV. This result shows that the ballistic deficit effect can be suppressed by two orders of magnitude by comparison with earlier systems and thus has practically no influence on the performance of the circuit of the invention. FIG. 5 illustrates the results of a test measurement with a prototype of the circuit in comparison to a conventional spectroscopy amplifier with Gaussian pulse shaping (Silena 7611 L specroscopy amplifier) for charge collection times of 20, 50, 100, 200 or 500 ns and equivalent time constant of the pulse shaping of 2 μs. For a signal of 1.3 MeV with a charge collection time of 500 ns, the reduction in the pulse amplitude due to the ballistic effect in the Gaussian pulse shaper amounts to 79.4 KeV (upper spectrum).

For the prototype of the circuit according to the invention under the same conditions, the reduction is only 3.1 KeV (lower spectrum) The different charge collection times of the signal were simulated in this test by pulser signals of the same amplitude but different rise times Since both, the "charge carrier trapping" and "ballistic deficit" effects are attributable to a similar or delayed release of charge the above considerations are also valid for the suppression of the charge carrier trapping effect.

The circuit of FIG. 1 will suppress the majority charge carrier trapping effect in comparison to quasi Gaussian and other pulse shaping systems with similar characteristics as have been discussed heretofore.

The circuit of FIG. 1 also is characterized by a significant noise suppression/counting rate ratio or noise suppression-dead time product. Because of the growing interest in the use of high resolution Ge detectors with cooled FET, in which processing of high counting rates is desired, and where one must as a result operate with peaking times of less than 10 μs or total dead time for pulse processing of less than 30 to 40μs, only the dominant delta noise becomes significant and requires discussion.

The criteria by which different pulse shaping networks can be compared thus is:

$$NR = \overline{N_D^2} \cdot T_D \qquad (9)$$

In this equation $\overline{N_D^2}$ is the noise index for the delta noise of the pulse shaper and $T_D$ represents the total dead time for processing a single radiation event. The noise index-counting rate factor (noise-counting rate or NR factor) is invariant with respect to time constant of the pulse shaping and thus an ideal criterium for evaluating the efficacy of the different pulse shapers.

The NR factors for different pulse shaping networks can be derived from the literature (P. Goulding and D. Landis, IEEE Trans. Nuc. Sci. 29 (1982) 3; E. Fairstein IEEE Trans. Nuc. Sci. 37 (1990) 2).

For the triangular, quasi triangular gated integrators, sin-N, 6th order, Gaussian or 7th order quasi Gaussian pulse shapers, the NR factors are respectively 6.0, 7.63, 7.35, 8.46, 9.0 or 9.4.

To determine the NR factor of the circuit arrangement of FIG. 1, the noise index of the delta noise is determined by the relationship $$\overline{N_D^2} = \frac{2}{L \cdot T_S} \frac{2}{N \cdot T_S} \frac{2}{L \cdot T_S} \qquad (10)$$

Here L represents the number of all those deconvolution windows which cover the charge distribution of the radiation event completely, N represents the number of windows which do not contain any event charge contribution and $T_S$ represents the duration of the sampling interval. $T_S$ represents the limiting frequency permitted by the antialiasing filter ahead of the analog-to-digital converter so that the sampling theorem is fulfilled.

The dependency of the suppression of the delta noise upon L has already been discussed above. The exact characteristic NR factor according to equation 10 is obtained by integration of the squared first derivative of the residual function of the step noise over the total processing interval.

The contribution of the second term in equation 10 can be held to be operationally small in principle by appropriate choice of N. However, there can be an increase in the inertia of the system with respect to relatively slow variations as can be induced by temperature changes or microphonic effects. The optimal selection of N, about 2–3 orders of magnitude greater than M, can be made only in concrete cases. For further details reference is made to the literature (e.g. F. Goulding, Nucl. Instr. Meth. (1972) 100).

The total dead time for the pulse processing $T_D$ can be easily estimated from the double pulse resolution of the circuit arrangement. An event is accepted and a result is produced when the detected event does not follow a preceding event more rapidly than the $L \cdot T_S$ time interval and is in turn not followed by a consecutive one at a distance shorter than a time interval of $M \cdot T_S$. Then $$T_D = M \cdot T_S + L \cdot T_S = \qquad (11)$$

$$2 \cdot L \cdot T_S + P \cdot T_S = L \cdot T_S \cdot \left(2 + \frac{P}{L}\right)$$

In this relationship P is the maximum charge collection time in units of the sampling intervals which in the concrete case can be determined after the desired ballistic deficit suppression. If one selects $L \cdot T_S = 4$ μs and $P \cdot T_S = 800$ ns, corresponding to a P/L ratio of 0.2, equation (11) gives $$T_D = 2.2 \cdot L \cdot T_S \qquad (12)$$

If one then introduces equations (10) and (12) into equation (9), the NR factor for the circuit arrangement will be NR=4.4.

A comparison of this NR factor with the NR factors of the pulse shaping networks currently in use makes the improvement with the circuit arrangement of FIG. 1 clear. In the case of a gated integrator it represents an improvement of 68% which increases to an improvement of 110% if one compares with the quasi-Gaussian pulse shaper.

Only the triangular pulse shaper shows comparable efficacy since the improvement with respect to it is only 36%. However, a realization of a pure triangular pulse shaper with analog components is practically impossible and it has been discussed only to show the asymptotic limit of all quasi triangular pulse shapers. The same applies to the true Gaussian pulse shaper whose NR factor of 9 corresponds to the asymptotic limit of all quasi-Gaussian pulse shapers and represents a loss of performance by about 100% compared to the circuit of FIG. 1.

The improved noise index-counting rate factor of the circuit arrangement of FIG. 1 results, in practice, in comparison to conventional modern pulse shapers for comparable noise characteristics, from a 70% to 90% higher counting rate.

Figure 6:
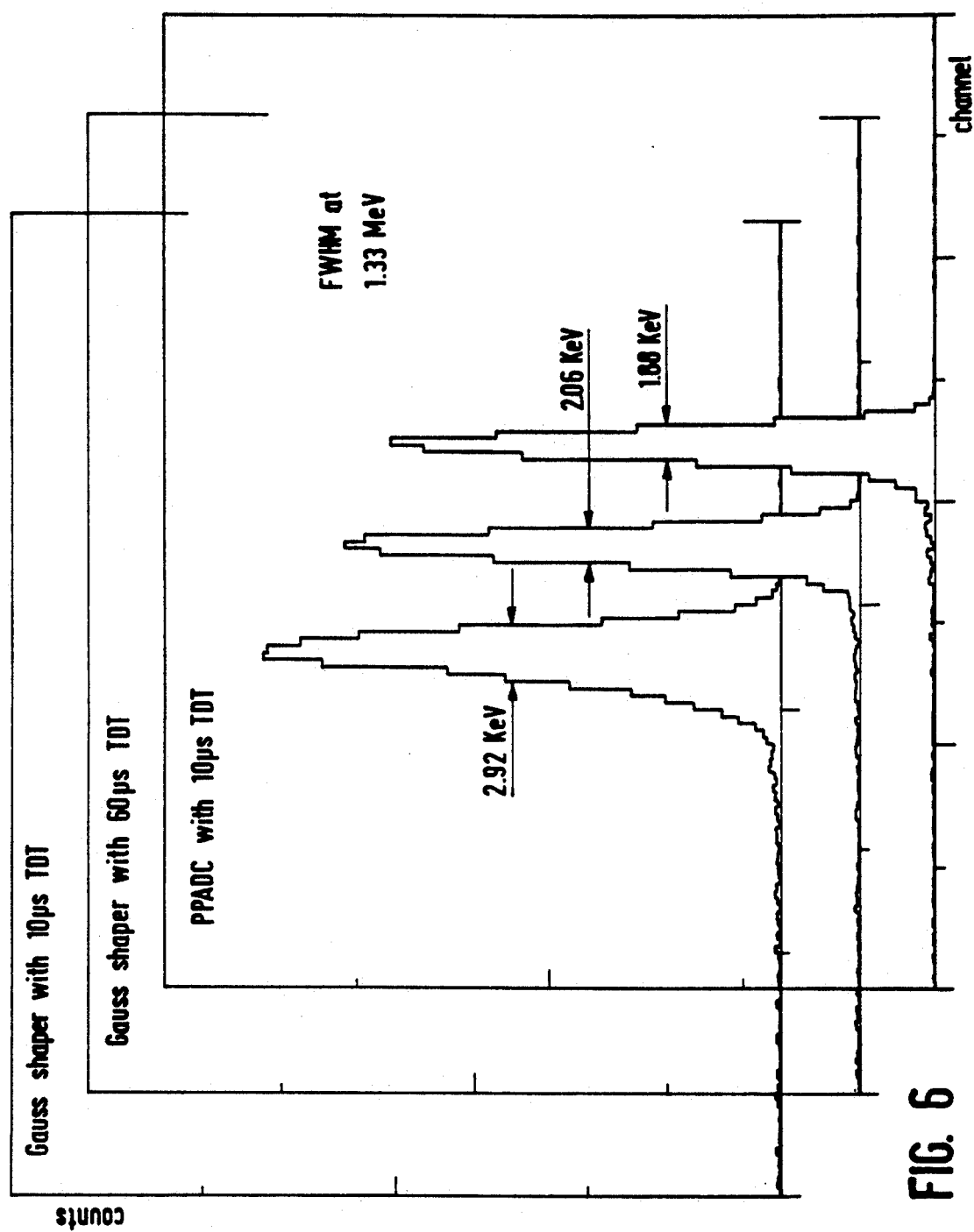

For a setting of the pulse shaping time constant to 1 $\mu$s, estimated for a high rate system and associated with a total dead time of the signal processing (TDT) of 10 $\mu$s in FIG. 6 the invention is compared for a high volume n-type germanium detector with a quasi-Gaussian pulse shaper (SILENA 7611 L spectroscopy amplifier) for an experimentally measured energy resolution of the 1.332 KeV $\gamma$ line of $^{60}$Co. The full width half maximum amounts to 2.92 KeV (upper spectrum) for the quasi-Gouss shaper. With a prototype of the circuit of FIG. 1, under the same conditions the full width half maximum is 1.88 KeV (lower spectrum); this value is even better than that which can be obtained with a pulse shaping time constant of 6 $\mu$s for the quasi-Gaussian pulse shaper reaching a maximum resolution of 2.06 KeV (intermediate spectrum).

The circuit of FIG. 1, therefore, reproduces such a resolution under pulse shaping parameter which enable a nine times higher counting rate.

The circuit of FIG. 1 also yields digital results directly while all other pulse shapers require an analog to digital conversion at the output to digitalize the amplitudes of their output signals. This results in an increase of the dead time $T_D$ and consequently the NR factor. Since a general discussion of the features of combined systems involving pulse shapers and ADC would be difficult to evaluate, only a numerical example, for hypothetical systems can be discussed. If one assumes a combined system with a gated integrator (e.g. ORTEC 672) with an effective pulse shaping time constant of $\tau_s=2.5\mu$s (corresponding to a pulse processing time of $2.\tau_s=5\mu$s and a dead time thus of 10$\mu$) and an ADC operating by successive approximation (e.g. SILENA 7423UHS) with a 3.0 $\mu$s conversion time and 0.5 $\mu$s rise time protection interval, the total dead time of the system can be estimated as 10 $\mu$s+0.5 $\mu$s+3.5 $\mu$s=14$\mu$s.

If one compares this value with the dead time of the circuit according to FIG. 1 with an equivalent pulse shaping of L.$T_S$=3 $\mu$s with a maximum charge collection time of P.$T_S$=0.8 $\mu$s the result is 2.3 $\mu$s+0.8 $\mu$s=6.8 $\mu$s. Consequently, by comparison with a system in which an ADC is required to digitize the result, an efficiency difference between a gated integrator and the circuit of the invention according to FIG. 1 increases from 68% to 120%. In other words the circuit of the invention permits with the same degree of noise suppression a 120% higher counting rate in comparison with a state of the art combination of the gated integrator and a successive approximation ADC.

Figure 2:
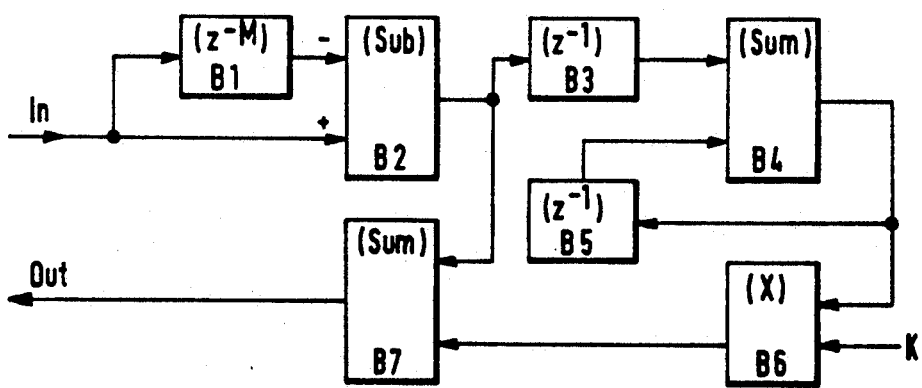
FIG. 2 is a block diagram of the moving window deconvoluter module of this circuit.

In the circuit AU of FIG. 2, the input In is applied to an M-stage digital delay B1 with a multiplication factor, the output of which is applied to the negative input of a subtracter B2 which receives the input directly.

The output is applied both to the first summer through the single stage delay B3 and to the output summer 1 or adder B7.

The output of summer B4 is applied through the single-stage delay B5 to the other summation input of the first summer B4 and to a multiplier B6 having a constant multiplication input K. The output of the latter is applied to the summer B7.

Figure 3:
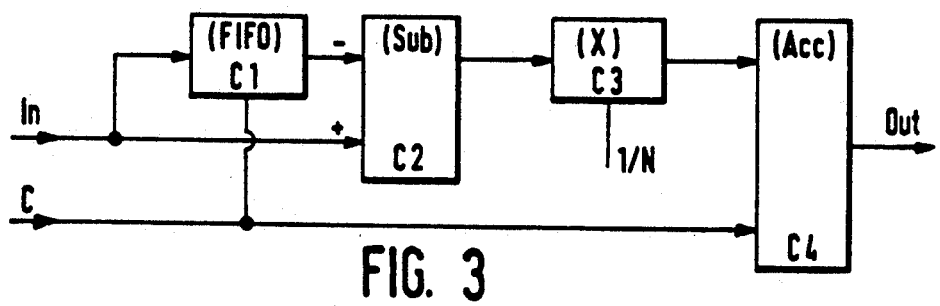
FIG. 3 is a block diagram of the mean value forming module of the invention.

As has been indicated previously, the circuit MAU of FIG. 3 provides an input directly to the positive input terminal of the subtracter C2, and an input to a first in first out memory or storage C1 whose output is applied to the negative input of the subtracter C2. The subtracter output is applied to the multiplier C3 having the constant multiplication factor 1/N and the output of the latter is applied to the accumulator C4 whose output forms the output of this circuit. The clock signals, supplied by the circuit A2, are applied in common to the FIFO storage C1 and the accumulator C4.

Figure 4:
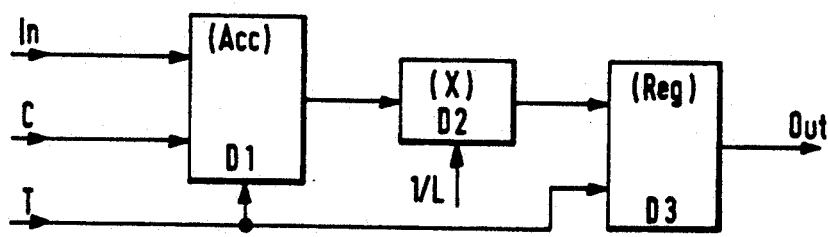
FIG. 4 is a block diagram of the averaging module.

The digital signal processing circuit of FIG. 4 has an accumulator D1 receiving the input and providing an output to a multiplier D2 having the constant multiplication factor 1/L and delivering its signal to the register D3 whose output forms the output of the circuit. A clock input from the control signal generator A2 is applied to the accumulated D1 and control signals T are applied to both the accumulator and the register as reset signals. These signals also derive from circuit A2.

We claim:

1. A circuit arrangement for digital processing of semi-conductor detector signals and for evaluation of the total charge of a radiation event generated in the detector wherein a charge sensitive preamplifier is connected to the detector, said circuit arrangement comprising:
a fast analog-to-digital converter having an input connected to an output of said charge sensitive preamplifier for sampling and digitalizing of the preamplifier signal received from said preamplifier;
a time detector and control unit connected to said preamplifier for determination of the beginning of a signal to be processed and for generating control signals for said circuit arrangement;
a moving window deconvoluter connected to said fast analog-to-digital converter for numerical deconvolution of a digitalized signal from the fast analog-to-digital converter into which signal a transfer function of the preamplifier and discrete charge distribution functions of radiation events and step noise are convoluted, said moving window deconvoluter having a time window of a width of M sampling intervals and generating a continuous series of deconvolution results spaced apart by one sampling interval, the time window sliding over the sampling values of the digitalized signal so that each new result represents a shift of the time window relative to a preceding result;

means connected to said moving window deconvoluter for determining a total charge of a radiation event from L deconvolution results of a series of said deconvolution results generated by said moving window deconvoluter and which results completely contain the total charge of the same event;

means connected to said moving window deconvoluter for determining a contribution of temporary step noise from N deconvolution results of said series which contain no charge relates to any radiation event; and a first subtractor connected to said means for determining said total charge and to said means for determining said contribution of temporary step noise for subtracting a value representing said contribution from a value representing said total charge, thereby calculating an end result representing a total charge quantity liberated by a single radiation event in said detector, M being greater by L sampling intervals than a maximum time interval within which a liberation of charge by a single radiation event can occur, N being equal to or greater than L.

2. The circuit arrangement defined in claim 1 wherein said moving window deconvoluter comprises:

another subtractor having a positive input connected directly with an output of said fast analog-to-digital converter, and a negative input;

an M-stage digital delay connected between said output of said fast analog-to-digital converter and said negative input of said other subtractor, whereby M represents a width of a time window over which numerical deconvolution is performed;

a first single-stage delay connected to an output of the other subtractor;

a first summer having one input connected to said first single-stage delay, a second input and an output;

a second single-stage delay connected in a feedback loop between said output of said first summer and said second output of said first summer;

a multiplier having a multiplication factor K connected to said output of said first summer; and an output summer having one input connected to said output of said subtractor and a second input connected to an output of said multiplier, whereby K is a constant predetermined by a delay constant of said preamplifier and a sampling rate of the analog-to-digital converter.

3. The circuit arrangement defined in claim 1 wherein said means for determining total charge includes an averager for determining a mean value over a predetermined number of data elements from a continuous data stream.

4. The circuit arrangement defined in claim 3 wherein said averager includes:

an accumulator having a data input connected with said moving window deconvoluter, a clock input connected with said time detector and control unit, and a reset input connected with a time switch control input of the averager;

a multiplier having a constant multiplication factor 1/L connected to an output of said accumulator; and a register having a data input connected with an output of the multiplier having the constant multiplication factor 1/L, a clock input connected with said time switch control input, and an output connected to the positive input of said first subtractor.

5. The circuit arrangement defined in claim 1 wherein said means for determining said contribution includes a moving mean-value former for shifting averaging over a fixed number of successive data elements and in which the region from which data is processed is shifted over the data flow and which produces an actualized temporary average value at each new data entry.

6. The circuit arrangement defined in claim 5 wherein said moving mean-valve former includes:

a further subtractor having a positive input connected to said output of said moving window deconvoluter, a negative input and an output;

a FIFO storage connected between said output of said moving window deconvoluter and said negative input of said further subtractor;

a multiplier having a constant multiplication factor 1/N connected to said output of said further subtractor and having an output; and an accumulator having an output connected to the negative input of said first subtractor and an input connected to said output of said multiplier having said constant multiplication factor 1/N, said FIFO storage and said accumulator of said moving mean-valve former having identical clock frequency.

7. The circuit arrangement defined in claim 1 wherein between said preamplifier and said fast analog-to-digital converter a low-pass filter is provided to avoid aliasing effects.

8. The circuit arrangement defined in claim 7 wherein said moving window deconvoluter comprises:

another subtractor having a positive input connected directly with an output of said fast analog-to-digital converter, and a negative input;

an M-stage digital delay connected between said output of said fast analog-to-digital converter and said negative input of said other subtractor, whereby M represents a width of a time window over which numerical deconvolution is performed;

a first single-stage delay connected to an output of the other subtractor;

a first summer having one input connected to said first single-stage delay, a second input and an output;

a second single-stage delay connected in a feedback loop between said output of said first summer and said second output of said first summer;

a multiplier having a multiplication factor K connected to said output of said first summer; and an output summer having one input connected to said output of said subtractor and a second input connected to an output of said multiplier, whereby K is a constant predetermined by a delay constant of said preamplifier and a sampling rate of the analog-to-digital converter.

9. The circuit arrangement defined in claim 8 wherein said means for determining total charge includes an averager for determining a mean value over a predetermined number of data elements from a continuous data stream.

10. The circuit arrangement defined in claim 9 wherein said averager includes:

an accumulator having a data input connected with said moving window deconvoluter, a clock input connected with said time discriminator and control unit, and a reset input connected with a time switch control input of the averager;

a multiplier having a constant multiplication factor 1/L connected to an output of said accumulator; and a register having a data input connected with an output of the multiplier having the constant multiplication factor 1/L, a clock input connected with said time switch control input, and an output connected to the positive input of said first subtractor.

11. The circuit arrangement defined in claim 10 wherein said means for determining said contribution includes a moving mean-value former for shifting averaging over a fixed number of successive data elements and in which the region from which data is processed is shifted over the data flow and which produces an actualized temporary average value with each new data set as a result.

12. The circuit arrangement defined in claim 11 wherein said moving mean-valve former includes:

a further subtractor having a positive input connected to said output of said moving value deconvoluter; a negative input and an output;

a FIFO storage connected between said output of said moving window deconvoluter and said negative input of said further subtractor;

a multiplier having a constant multiplication factor 1/N connected to said output of said further subtractor and having an output; and an accumulator having an output connected to the negative input of said first subtractor and an input connected to said output of said multiplier having said constant multiplication factor 1/N, said FIFO storage and said accumulator of said moving mean-valve former having identical clock frequency.

* * * * *